(12) United States Patent
Namba (10) Patent No.: US 10,509,481 B2
(45) Date of Patent: Dec. 17, 2019

(54) KEY INPUTTING APPARATUS

(71) Applicant: Brother Kogyo Kabushiki Kaisha, Nagoya-shi, Aichi-ken (JP)

(72) Inventor: Mamoru Namba, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/143,941

(22) Filed: Sep. 27, 2018

(65) Prior Publication Data
US 2019/0094983 A1   Mar. 28, 2019

(30) Foreign Application Priority Data

Sep. 28, 2017   (JP) ................................. 2017-187637

(51) Int. Cl.
*G06F 3/02* (2006.01)
*H04N 1/00* (2006.01)
*H01H 13/00* (2006.01)

(52) U.S. Cl.
CPC .......... *G06F 3/0202* (2013.01); *H01H 13/00* (2013.01); *H04N 1/00384* (2013.01); *H04N 2201/0094* (2013.01)

(58) Field of Classification Search
CPC .............. G06F 3/0202; H04N 1/00384; H04N 2201/0094; H01H 13/00
See application file for complete search history.

(56) References Cited

U.S. PATENT DOCUMENTS

| 9,704,669 B2 | 7/2017 | Namba | |
| 2007/0222754 A1* | 9/2007 | Chen | G06F 3/0219 345/163 |
| 2009/0021400 A1* | 1/2009 | Tsai | G06F 3/0202 341/22 |
| 2011/0278146 A1* | 11/2011 | Zheng | H01H 13/705 200/5 A |
| 2012/0080297 A1 | 4/2012 | Takeuchi et al. | |
| 2016/0293355 A1 | 10/2016 | Namba | |

FOREIGN PATENT DOCUMENTS

| JP | 2001-266695 A | 9/2001 |
| JP | 2011-129160 A | 6/2011 |
| JP | 2016-194810 A | 11/2016 |

* cited by examiner

*Primary Examiner* — Muhammad N Edun
(74) *Attorney, Agent, or Firm* — Banner & Witcoff, Ltd.

(57) ABSTRACT

A key inputting apparatus includes: a substrate provided with a switch; a key having a depression surface and a back surface on an opposite side to the depression surface, and a contacting section projecting from the back surface in a first direction from the depression surface toward the back surface; a panel having an opening in which the key is arranged; a first plate arranged between the substrate and the key in the opening of the panel; a second plate supported by the first plate between the key and the first plate; and a third plate arranged between the first plate and the substrate. The first to third plates are formed with first to third through portions, respectively, through each of which the contacting section is passable. The second plate is formed with a leaf spring section urging the key in a second direction opposite to the first direction.

6 Claims, 9 Drawing Sheets

KEY INPUTTING APPARATUS

CROSS REFERENCE TO RELATED APPLICATION

The present application claims priority from Japanese Patent Application No. 2017-187637 filed on Sep. 28, 2017, the disclosures of which are incorporated herein by reference in its entirety.

BACKGROUND

Field of the Invention

The present invention relates to a key inputting apparatus which is capable of outputting a signal in a case that a key member thereof is depressed or pushed downward.

Description of the Related Art

There is known a key inputting unit including a holding member and a plate-shaped conductive member. The holding member is made of resin and formed with a cantilevered leaf spring section configured to push a key upwardly. The plate-shaped conductive member is arranged between the holding member and a substrate.

SUMMARY

In the above-described key inputting unit, the leaf spring section is made of resin, and thus the durability in a case that the key is repeatedly depressed is low, which in turn causes any inconvenient or problem in the key operation in some cases. In addition, since the leaf spring section is formed to be cantilevered, the static electricity accumulated in the leaf spring section is moved such that the static electricity is discharged from a forward or tip end portion of the leaf spring section toward the substrate, in some cases. Since the conductive member is arranged between the holding member and the substrate, it is possible to receive the static electricity by the conductive member to some extent; there is, however, such a problem that any static electricity, which cannot be received fully by the conductive member, flows toward the substrate to thereby cause any malfunction, glitch, etc., in the unit.

An object of the present teaching is to provide a key inputting apparatus capable of improving the durability of the leaf spring section, and of suppressing such movement of the static electricity that the static electricity is discharged from the end portion of the leaf spring section toward the substrate.

According to an aspect of the present teaching, there is provided a key inputting apparatus including: a substrate provided with a switch; a key having a depression surface and a back surface on an opposite side to the depression surface, and a contacting section projecting from the back surface in a first direction from the depression surface toward the back surface, the contacting section making contact with the switch in a state that the depression surface is depressed; a panel having an opening in which the key is arranged; a first plate arranged between the substrate and the key in the opening of the panel, the first plate being made of a resin and formed with a first through portion through which the contacting section is passable and which is configured to regulate movement of the contacting section in a crossing direction crossing the first direction; a second plate supported by the first plate between the key and the first plate, the second plate being made of a metal, the second plate being formed with: a second through portion through which the contacting section is passable; and a leaf spring section which urges the key in a second direction opposite to the first direction, the leaf spring section being a cantilevered leaf spring in which an end portion is a free end; and a third plate arranged between the first plate and the substrate, the third plate being made of a metal and formed with a third through portion into which the contacting section is insertable.

According to the above-described configuration, the durability is improved since the leaf spring section configured to urge the key in the second direction is formed in the second plate made of a metal. Further, the first plate and the third plate are present in this order between the second plate and the substrate. Accordingly, even in a case that the static electricity accumulated in the leaf spring section is moved, for example, such that the static electricity is discharged from the end portion of the leaf spring section toward the substrate, it is possible to receive the static electricity firstly by the first plate. The static electricity, which cannot be received fully by the first plate, can be received by the third plate made of the metal. This makes the movement of the static electricity to the substrate to occur less easily, thereby making it possible to suppress any malfunction of the key inputting apparatus.

DESCRIPTION OF THE EMBODIMENTS

Figure 1:
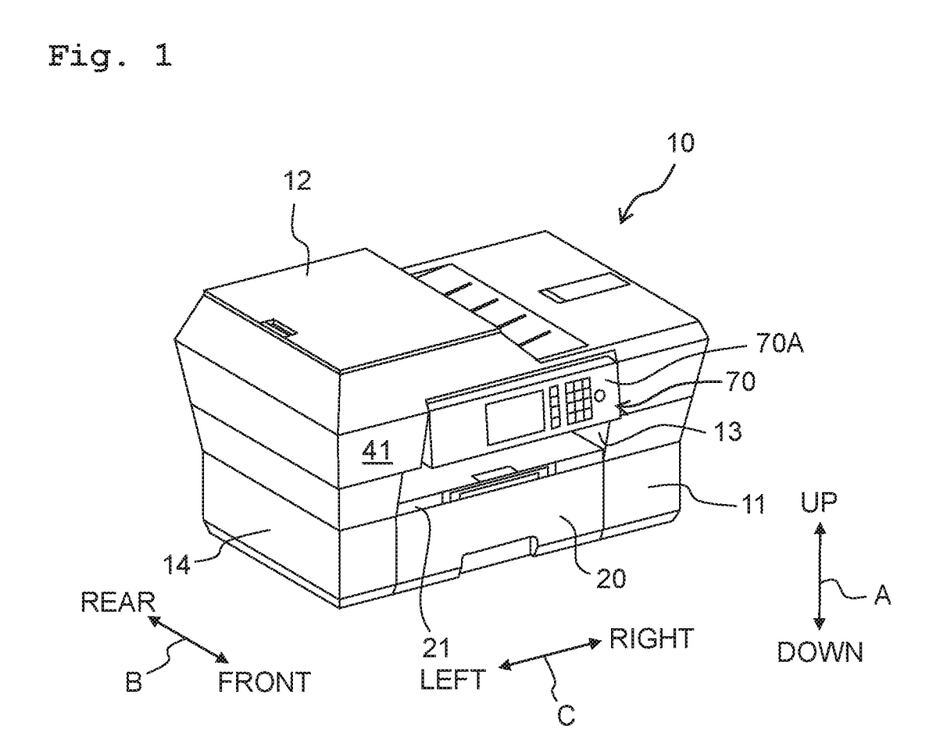
FIG. 1 is a perspective view of a multi-function peripheral in which an operating apparatus as a key inputting apparatus according to an embodiment of the present teaching is adopted.

In the following, an explanation will be given about a multi-function peripheral in which an operating apparatus as a key inputting apparatus according to an embodiment of the present teaching is adopted. As depicted in FIG. 1, a state in which a multi-function peripheral 10 is usably installed in a horizontal plane will be referred to as a "usable state" in the following explanation. An up-down direction A (an exemplary third direction) is defined with the "usable state" (the state depicted in FIG. 1) as the reference. Further, a front-rear direction B is defined, with a side on which an opening 13 of the multi-function peripheral 10 is provided is designated as the frontward side (front surface 41 or front side 41), and a left-right direction C (an exemplary fourth direction) is defined as viewing the multi-function peripheral 10 from the frontward side (front surface 41). Further, in the following explanation about respective members, the up-down direction A, the front-rear direction B and the left-right direction C are defined in a state that the respective members are installed in (assembled or attached to) the multi-function peripheral 10.

<Overall Configuration of Multi-Function Peripheral 10>

As depicted in FIG. 1, the multi-function peripheral 10 is formed to have a substantially rectangular parallelepiped shape. A scanner unit 12, configured to read an image, which is recorded on an original or manuscript such as paper (paper sheet), with an image sensor so as to obtain data of the image (image data), is provided on an upper portion of the multi-function peripheral 10. Further, a printer unit 11 which records an image on paper P (paper sheet P; see FIG. 2) based on, for example, the above-described image data, etc., is provided on a lower portion of the multi-function peripheral 10. In a printer casing 14 (which will be described later on) of the printer unit 11, an operating apparatus 70 via which the multi-function peripheral 10 is operable is disposed at an upper portion of the front surface 41.

<Scanner Unit 12>

The scanner unit 12 is configured as a so-called flat bed scanner; any detailed explanation about the inner configuration of the scanner unit 12 will be omitted.

<Printer Unit 11>

The Printer Unit 11 is Formed to have a Substantially Rectangular Parallelepiped shape, and has a printer casing 14 in which the opening 13 is formed in the front surface thereof.

<Paper Feed Tray 20>

Figure 2:
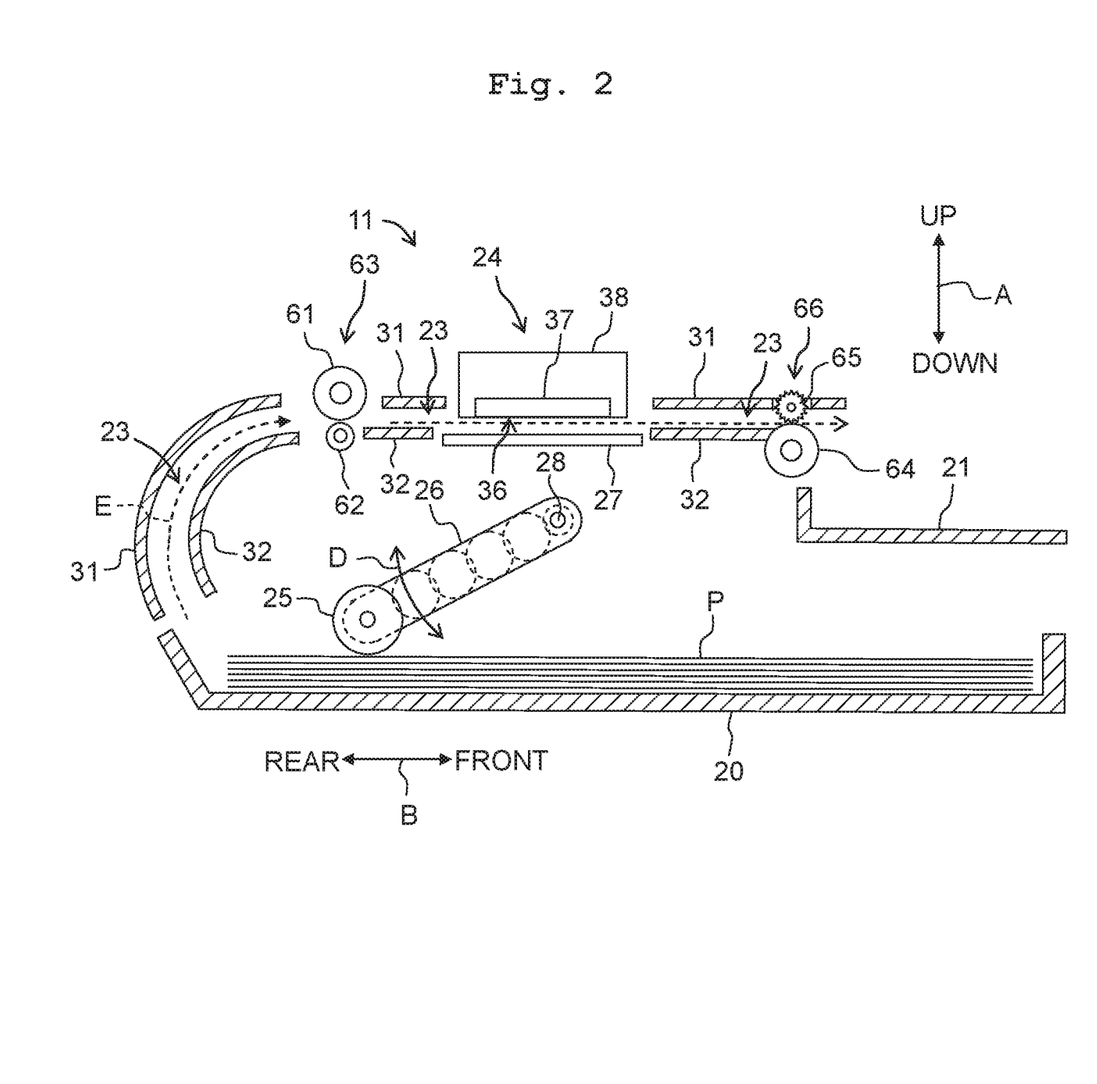
FIG. 2 is a vertical cross-sectional view schematically depicting the internal configuration or structure of a printer unit as depicted in FIG. 1.

As depicted in FIG. 2, the printer casing 14 has, in the inside thereof: a paper feed tray 20; a conveyance roller pair 63 and a discharge roller pair 66 which convey the paper sheet P, accommodated in the paper feed tray 20, along a conveyance route 23; a recording section 24; and the like. The paper feed tray 20 is insertable into and removable from the opening 13 in the front-rear direction B, and accommodates the paper sheet P in the inside thereof. The recording section 24 records, on the paper sheet P conveyed in the conveyance route 23, an image, for example based on an image data read from an original by the scanner unit 12.

As depicted in FIG. 2, a feeding roller 25 is arranged at a location above the paper feed tray 20 and below the recording section 24. The feeding roller 25 is rotatably supported by a feeding arm 26 at a front end thereof. The feeding roller 25 rotates by a driving force transmitted to the feeding roller 25 from a conveyance motor (not depicted in the drawings). The feeding arm 26 moves pivotably or rotatably in a direction of an arrow D, with a shaft 28 provided on a base end portion of the feeding arm 26 as the center of the pivot motion. With this, the feeding roller 25 is capable of making contact with and separating away from the paper feed tray 20 or the paper sheet P supported by the paper feed tray 20.

<Paper Discharge Tray 21>

The paper sheet P on which the image is recorded is discharged to the paper discharge tray 21 arranged at a position on the upper side of (above) the paper feed tray 20, and is placed on the paper discharge tray 21. Here, the paper discharge tray 21 is arranged at the position above the paper feed tray 20 in an overlapping manner, and the paper discharge tray 21 and the paper feed tray 20 are integrally inserted into and removed from the opening 13. In a state that the paper feed tray 20 is inserted into the opening 13, the paper discharge tray 21 defines the bottom surface of the opening 13 and is located at a position below an operating apparatus 70 (to be described later on). Namely, the paper sheet P having the image recorded thereon is discharged to the inside of the opening 13.

<Conveyance Route 23>

As depicted in FIG. 2, the conveyance route 23 is a route or path which makes a U-turn while extending from the lower side to the upper side, at a rear end portion of the paper feed tray 20 as the base or starting point, and then extends frontwardly and reaches the paper discharge tray 21. The conveyance route 23 is a space defined by a first guide member 31 and a second guide member 32 which are arranged to face each other with a predetermined interval (gap) intervened therebetween. The paper sheet P is conveyed along the conveyance route 23 in a conveyance direction E indicated by an arrow of a dot-dash chain line in FIG. 2.

<Conveyance Roller Pair 63 and Discharge Roller Pair 66>

As depicted in FIG. 2, the conveying roller pair 63 is arranged in the conveyance route 23 on the upstream side in the conveyance direction E relative to the recording section 24. The conveying roller pair 63 is constructed of a conveyance roller 61 and a pinch roller 62. The pinch roller 62 is pressed against the conveyance roller 61 by an elastic member (not shown) such as a spring, etc. The discharging roller pair 66 is arranged in the conveyance route 23 on the downstream side in the conveyance direction E relative to the recording section 24. The discharging roller pair 66 is constructed of a discharge roller 64 and a spur 65. The spur 65 is pressed against the discharge roller 64 by an elastic member (not shown) such as a spring, etc.

Each of the conveyance roller 61 and the discharge roller 64 is rotated by a driving force transmitted thereto from a conveyance motor (not shown). Each of the conveyance roller 61 and the discharge roller 64 to which the driving force is transmitted conveys the paper sheet P in the conveyance direction E while nipping the paper sheet P between itself and the pinch roller 62 or the spur 65.

<Recording Section 24>

As depicted in FIG. 2, the recording section 24 is arranged at a position above or over the conveyance route 23. A platen 27 is arranged at a position which is below the conveyance route 23 and at which the platen 27 faces the recording section 24. The platen 27 is a member which supports the paper sheet P which is being conveyed in the conveyance route 23 on an upper surface of the platen 27. The recording section 24 includes a recording head 37 arranged such that the recording head 37 is capable of facing the conveyance route 23, and a carriage 38 which supports the recording head 37. The recording head 37 is formed with a plurality of nozzles 36 from which an ink supplied from an ink cartridge (not shown) is discharged (jetted) toward the conveyance route 23. The carriage 38 is configured to be movable in the left-right direction 9 in a reciprocating manner Droplets of the ink (ink droplets) are discharged or jetted from the nozzles 36 toward a paper sheet P which is being conveyed along the conveyance route 23, while the carriage 38 is being moved reciprocally in the left-right direction 9. With this, an image is recorded on the paper sheet P.

In this embodiment, the ink-jet recording system is adopted as a system by which the recording section 24 records the image on the paper sheet P. Note that, however, there is no limitation to this. The image recording system may be, for example, the electro-photographic system, etc.

<Controller>

The controller (not depicted in the drawings) is configured to control the operation of the multi-function peripheral 10. The controller is constructed of a microcomputer and a variety of kinds of electronic parts or components. The controller controls the conveyance motor as described above so as to convey the paper sheet P. Further, the controller controls the recording section 24 so as to cause the recording section 24 to record an image, etc., on the paper sheet P. The controller is connected to the operating apparatus 70 depicted in FIG. 1. Signals, each of which corresponds to an input operation via a key inputting unit 50 or a touch panel unit 54, are inputted to the controller.

<Operating Apparatus 70>

Figure 3:
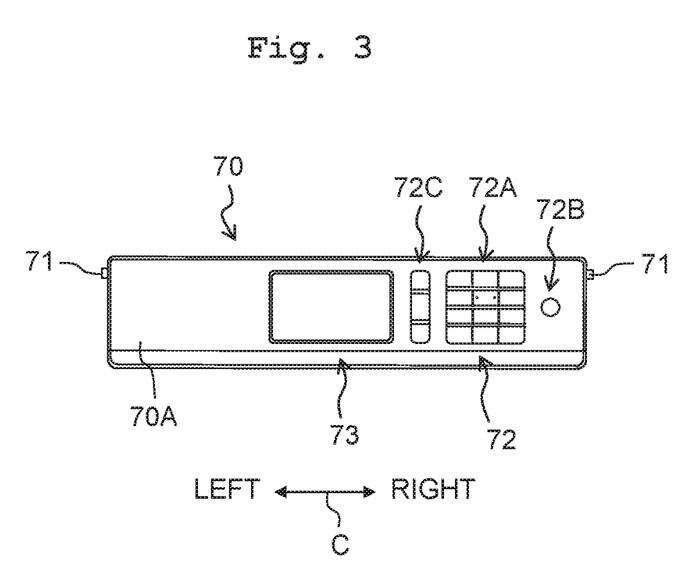
FIG. 3 is a front view of the operating apparatus as depicted in FIG. 1.

The operating apparatus (key inputting apparatus) 70 is supported rotatably, at a portion in the vicinity in the upper end of the operating apparatus 70, by a member constructing the front surface 41 of the printer casing 14. As depicted in FIG. 3, the operating apparatus 70 has both side surfaces in the left-right direction C of the operating apparatus 70; a rotating shaft 71 projecting in the left-right direction C is formed in an upper portion of each of the both side surfaces in the left-right direction C. In the member constructing the front surface 41 of the printer casing 14, holes (not depicted in the drawings) each of which is configured to fit (engage) with the rotating shaft 71 are formed respectively at positions facing the rotating shaft 71 of the operating apparatus 70. In a case that the rotating shaft 71 is inserted into the holes, the operating apparatus 70 is thereby made rotatable about the rotating shaft 71. The operating apparatus 70 has a substantially rectangular parallelepiped shape which is long in the left-right direction C.

Figure 4:
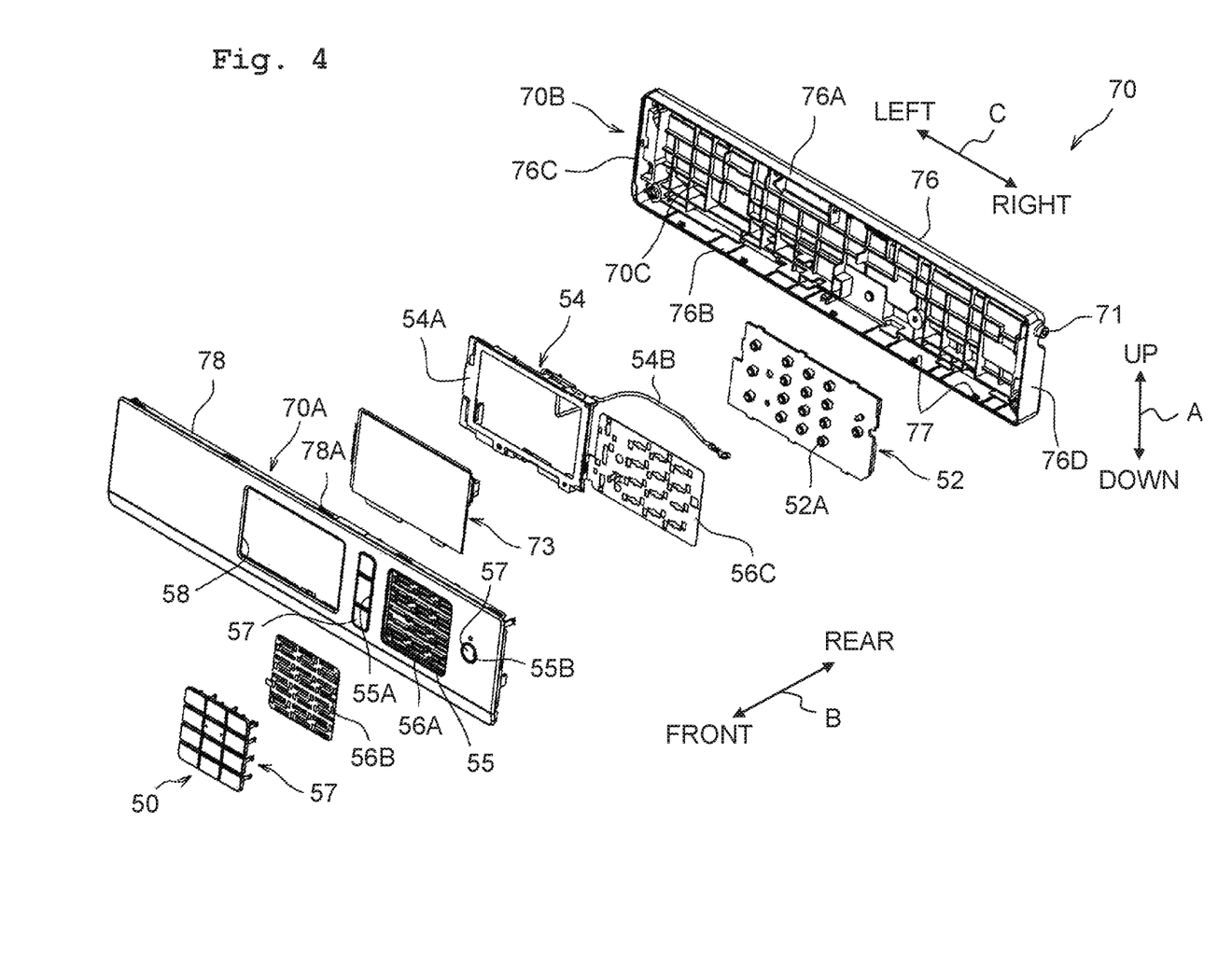
FIG. 4 is an exploded perspective view of the operating apparatus.
Figure 5:
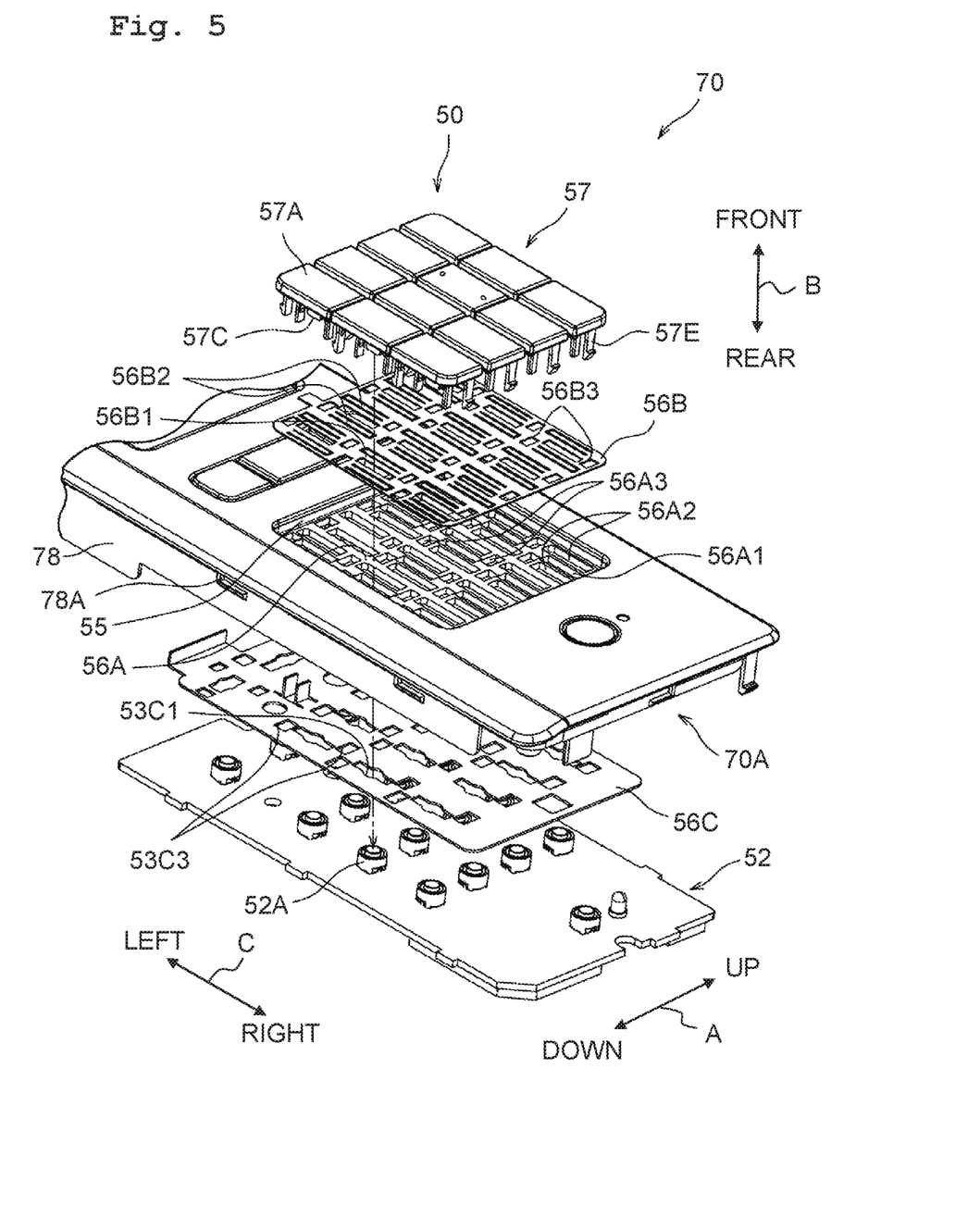
FIG. 5 is an exploded perspective view of main parts or components of the operating apparatus.

As depicted in FIG. 4, the operating apparatus 70 has a panel face member 70A positioned on the front side, and a box section 70B having a box shape and positioned behind the panel face member 70A. The panel face member (panel) 70A is provided with an operating key section 72 and a touch panel 73 as an input section, as depicted in FIG. 3. Further, as depicted in FIG. 4, the panel face member 70A is provided with openings 55, 55A and 55B corresponding to the operating key section 72 and an opening 58 corresponding to the touch panel 73. As depicted in FIGS. 4 and 5, the panel face member 70A is provided with a pair of plate-shaped sections 78 which project rearwardly, respectively along end portions in the up-down direction A of the panel face member 70A. In a state that the panel face member 70A is installed in the box section 70B, the pair of plate-shaped sections 78 are positioned in the inside of the box section 70B.

As depicted in FIG. 4, a plurality of ribs 70C are arranged in an inner bottom surface of the box section 70B so that the ribs 70C extend vertically and horizontally (lengthwise and crosswise). The plurality of ribs 70C are provided on the box section 70B such that front ends of the ribs 70C are at the same height in the front-rear direction B. The box section 70B has: a first side portion 76A, a second side portion 76B, a third side portion 76C and a fourth side portion 76D. The first side portion 76A and the second side portion 76B are formed respectively in end portions, in the up-down direction A of a bottom portion 76, which has a substantially rectangular parallelepiped shape, so that each of the first and second side portions 76A and 76B extends frontwardly. The third side portion 76C and the fourth side portion 76D are formed respectively in end portions in the left-right direction C of the bottom portion 76 so that each of the third and fourth side portions 76C and 76D extends frontwardly. A plurality of engaging portions 77 are provided on each of the first side portion 76A and the second side portion 76B. In the state that the panel face member 70A is installed in the box section 70B, the first and second side portions 76A and 76B face, respectively, the pair of plate-shaped portions 78 of the panel face member 70A. Engaged portions 78A are provided in a surface, of each of the pair of plate-shaped members 78, which faces one of the first and second side surfaces 76A and 78B, at locations corresponding to the engaging portions 77A, respectively. In a case that the engaging portions 77 are engaged with the engaged portions 78, respectively, the panel face member 70A is thereby fixed to the box section 70B in a state that the panel face member 70A closes the opening of the box section 70B.

<Operating Key Section 72>

As depicted in FIG. 3, the operating key section 72 and the touch panel 73 are provided on the panel face member 70A while being arranged side by side in the left-right direction C. The operating key section 72 includes a ten key section 72A, a power switch key 72B and a mode key section 72C.

The operating key section 72 is constructed of the key inputting unit 50 depicted in FIG. 4. The operating key section 72 includes a plurality of key members 57. In a case that each of the plurality of key members 57 is depressed by a user, a processing associated with each of the plurality of key members 57 is executed. The ten key section 72A mainly has a function of inputting signals indicating numbers from 0 (zero) to 9 to the controller. The power switch key 72B mainly has a function of switching ON and OFF the power source of the multi-function peripheral 10. The mode key section 72C mainly has a function of inputting signals regarding operation modes of the multi-function peripheral 10 to the controller. Key members 57, which are included in the plurality of key members 57 and which construct the ten key section 72A, are arranged in the inside of the opening 55 and are exposed on the surface of the panel face member 70A. A key member 57, which is included in the plurality of key members 57 and which constructs the power switch key 72B, is arranged in the inside of the opening 55B and is exposed on the surface of the panel face member 70A. Key members 57, which is included in the plurality of key members 57 and which construct the mode key section 72C, are arranged in the inside of the opening 55A and are exposed on the surface of the panel face member 70A.

<Touch Panel 73>

The touch panel 73 is supported by the touch panel unit 54. The touch panel unit 54 includes a support section 54A which supports the touch panel 73, and a driving device (not depicted in the drawings) which drives the touch panel 73. The touch panel 73 includes a liquid crystal display device and a position input device (which are not depicted in the drawings). The controller causes the touch panel 73 to display an instruction to the user, information regarding image recording, etc. Namely, the touch panel 73 is controlled by the controller to thereby perform a display processing for performing, for example, displaying the state of the apparatus, and a displaying processing for displaying the information regarding the image recording, etc.

The user depresses (presses downward) an image displayed on the touch panel 73 and/or the operating key section 72 based on information displayed on the touch panel 73 to thereby instruct execution of the image recording, etc. Each of the operating key section 72 and the touch panel 73 outputs a signal based on the depression by the user as described above to the controller. Namely, the operating key section 72 and the touch panel 73 perform an operation processing for receiving the depression. Further, in a case that an instruction for executing the image recording is given to the recording section 24 by the controller, the recording section 24 performs the image recording. Namely, the recording section 24 records an image on a paper sheet P in accordance with the processing instructed via the operating key section 72 and/or the touch panel 73. The touch panel 73 is exposed on the surface of the panel face member 70A via through opening 58.

<Key Inputting Unit 50>

The key inputting unit 50 constructs the ten key section 72A, the power switch key 72B and the mode key section 72C of the key inputting section 72. Here, however, an explanation will be given about the ten key section 72A, and any explanation regarding the power switch key 72B and the mode key section 72C will be omitted. As depicted in FIG. 5, the key inputting unit 50 includes a first plate-shaped member 50A arranged in the opening 55 of the panel face member 70A, a second plate-shaped member 56B arranged on the front side of the first plate-shaped member 56A, a third plate-shaped member 56C arranged on the rear side of the first plate-shaped member 56A, a substrate 52, and the plurality of key members 57.

<Substrate 52>

Figure 6:
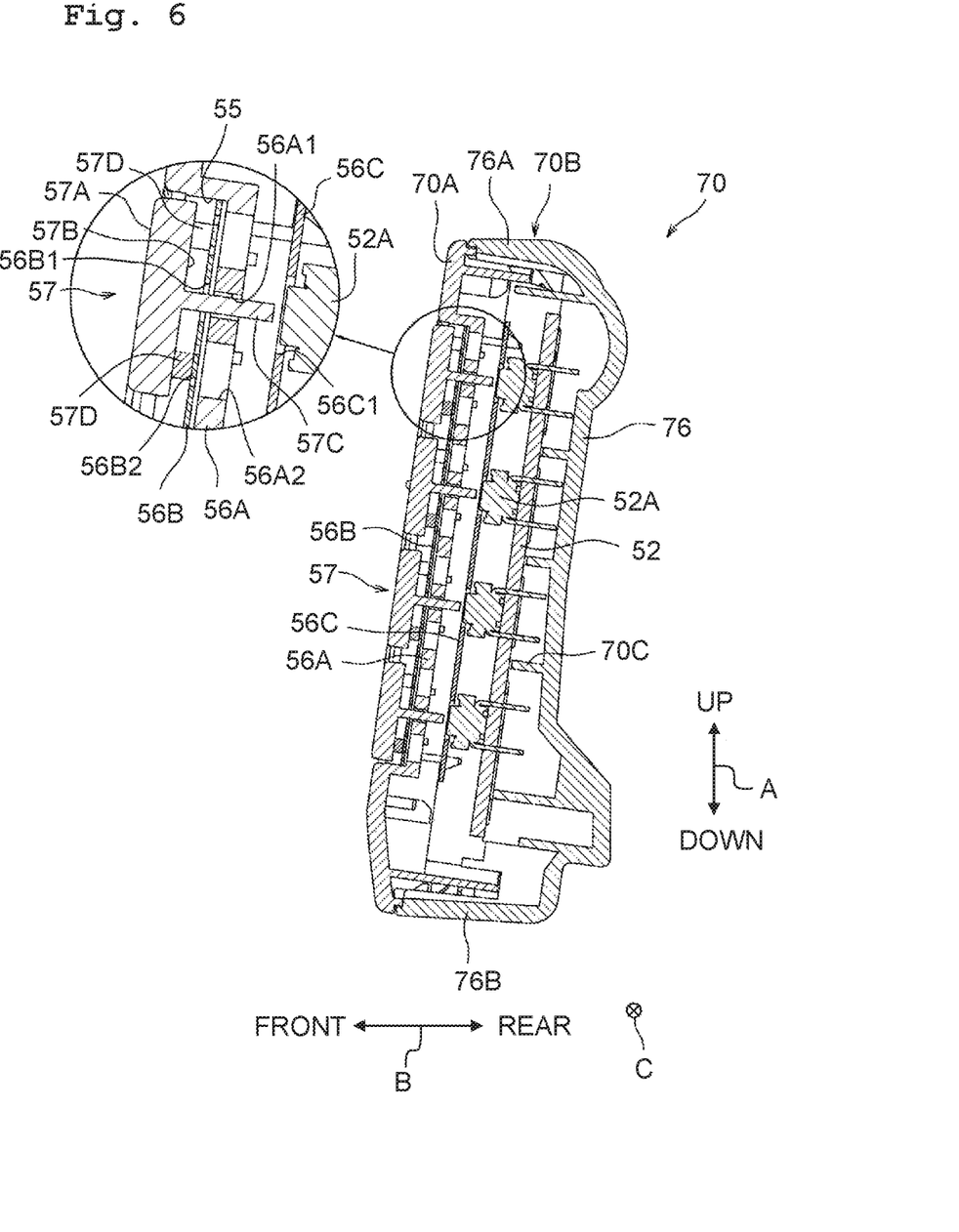
FIG. 6 is a vertical cross-sectional view of the operating apparatus.

As depicted in FIG. 6, the substrate 52 is arranged on the plurality of ribs 70C of the box section 70B, and is supported by the box section 70B. As depicted in FIGS. 4 and 5, a plurality of switches 52A are provided on the front surface of the substrate 52. In a case that each of the plurality of switches 52A makes contact with one of the key members 57 which is depressed by the user, each of the plurality of switches 52A thereby outputs a signal in accordance with the state of the switch 52A.

<Key Members 57>

As depicted in FIGS. 5 and 6, each of the key members 57 has a depression surface 57A which is depressed by the user, a back surface 57B on the opposite side to the depression surface 57A, a contacting section 57C and two projections 57D. The contacting section 57C projects rearwardly (in a first direction) from a substantially central portion in the back surface 57B. Further, the contacting section 57C has such a length that the contacting section 57C is separate and away from the switch 52A in a state that the user does not press the depression surface 57A rearwardly, and that the contacting section 57C makes contact with the switch 52A in a state that the user presses the depression surface 57A rearwardly.

The two projections 57D project rearwardly from the back surface 57B. Furthermore, one of the two projections 57D is arranged at a position above the contacting section 57C and the other of the two projections 57D is arranged at a position below the contacting section 57C. Moreover, the two projections 57D are arranged to shift from each other in the left-right direction C, and are arranged in such a state that each of the two projections 57D makes contact with an end portion of a leaf spring section 56B2 (to be described later on). Namely, in a case that the user presses the depression surface 57A rearwardly, the key member 57 is urged frontwardly by the leaf spring section 56B2. Further, the key member 57 is formed with catch sections (hook sections) 57E which project rearwardly from the back surface 57B, at both end portions in the left-right direction C of the key member 57. In a state that the key member 57 is installed, the catch sections 57E engage with the rear surface of the third plate-shaped member 56C passing through a through hole 56A3 (to be described later on) of the first plate-shaped member 56A, a through hole 56B3 (to be described later on) of the second plate-shaped member 56B and a through hole 56C3 (to be described later on) of the third plate-shaped member 56C, thereby preventing the key member 57 from dropping or detaching.

<First Plate-Shaped Member 56A>

The first plate-shaped member 56A is formed of a synthetic resin which is similar to that forming the panel face member 70A. As depicted in FIG. 6, the first plate-shaped member 56A is integrally formed with the panel face member 70A, at a rear end portion of the opening 55 of the panel face member 70A. Further, in the front-rear direction B, the first plate-shaped member 56A is arranged between the key members 57 (constructing the ten key section 72A) and the substrate 52. Furthermore, as depicted in FIG. 5, a plurality of through holes (first through portions) 56A1, a plurality of through holes (fourth through portions) 56A2 and a plurality of through holes 56A3 are formed in the first plate-shaped member 56A. Each of the through holes 56A1 is formed such that the contact section 57C of one of the key member 57 passes therethrough. Further, each of the through holes 56A1 is formed so as to restrict any movement of the contact section 57C on the front surface in the plane direction (crossing direction crossing the front-rear direction B) of the first plate-shaped member 56A. The plurality of through holes 56A2 are arranged such that two through holes 56A2, included in the plurality of through holes 56A2 (and forming a pair), correspond to each of plurality of the through holes 56A1. More specifically, two through holes 56A2 in each pair are arranged such that the two through holes 56A2 are adjacent to one of the through holes 56A1 and that the two through holes 56A2 sandwich one of the through holes 56A1 in the up-down direction A. The through holes 56A1 and the trough holes 56A2 are each formed to be long in the left-right direction C. Further, each of the through holes 56A2 faces the entirety of one of the leaf spring sections 56B2 (to be described later on) corresponding thereto such that, in a case that the key member 57 is depressed to thereby flex the leaf spring section 56B2 rearwardly, the leaf spring section 56B2 can enter to the inside of the through hole 56A2. Namely, each of the through holes 56A2 is formed such that the end portion of one of the leaf spring section 56B2 corresponding thereto can enter into and go out from the through hole 56A2. The plurality of through holes 56A3 are also arranged such that two through holes 56A3, included in the plurality of through holes 56A3 (and forming a pair), correspond to each of plurality of the through holes 56A1. More specifically, two through holes 56A3 in each pair are arranged such that the two through holes 56A3 are adjacent to one of the through holes 56A1 and on both of the right and left sides, respectively, of one of the through holes 56A1.

<Second Plate-Shaped Member 56B>

Figure 7:
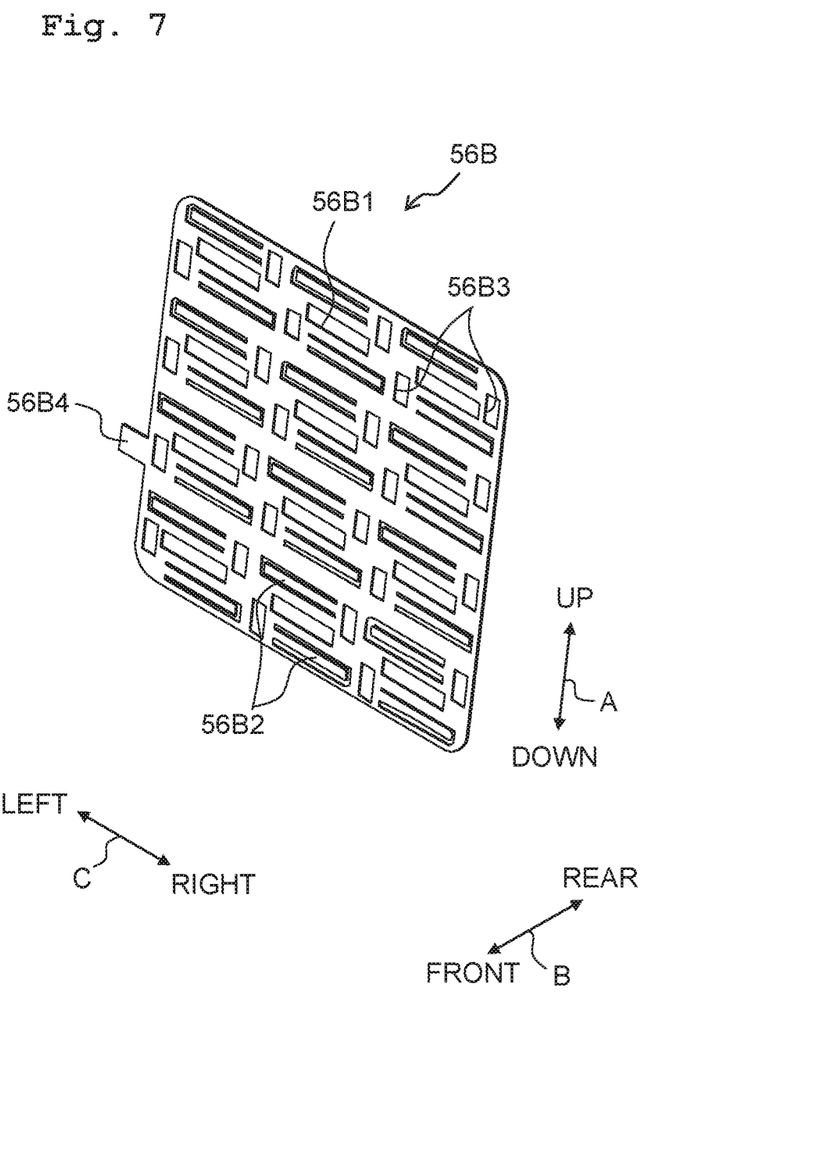
FIG. 7 is a perspective view of a second plate-shaped member as depicted in FIG. 4.

As depicted in FIGS. 5 and 6, the second plate-shaped member 56B is supported on the front surface of the first plate-shaped member 56A between the key members 57 constructing the ten key section 72A and the first plate-shaped member 56A. Further, the second plate-shaped member 56B is formed of a metallic material (for example, aluminum alloy, tin plate (SPTE), electrogalvanized steel sheet (SECC)). As depicted in FIG. 7, a plurality of through holes (second through portions) 56B1, a plurality of leaf spring sections 56B2 and a plurality of through holes 56B3 are formed in the second plate-shaped member 56B. Each of the through holes 56B1 are arranged such that the through holes 56B1 face the through holes 56A1, respectively, and that the contacting section 57C of each of the key members 57 to pass through one of the through holes 56B1. Further, each of the through holes 56B1 is formed to be long in the left-right direction C.

Each of the leaf spring sections 56B2 extends in the left-right direction C. Each of the leaf spring sections 56B2 is formed to be a cantilevered leaf spring in which an end portion (forward end portion) is a free end and a base end portion is a fixed end. The plurality of leaf spring sections 56B2 are arranged such that two leaf spring sections 56B2, included in the plurality of leaf spring portions 56B2 (and forming a pair), correspond to each (one piece) of plurality of the through holes 56B1. More specifically, two leaf spring sections 56B2 in each pair are arranged respectively such that the two leaf spring sections 56B2 is adjacent to one of the through holes 56B1 and that the two leaf spring sections 56B2 sandwich one of the through holes 56B1 in the up-down direction A. Further, each of the leaf springs 56B2 is arranged such that the entirety of each of the leaf spring portions 56B2 faces one of the through holes 56A2. In a case that the user depresses the key member 57 rearwardly, the leaf spring section 56B2 is thereby flexed rearwardly. In this situation, a portion or part of the leaf spring section 56B enters to the inside of the through hole 56A2 facing the leaf spring section 56B, and the leaf spring section 56B2 urges the key member 57 frontwardly (in the second direction). With this, in a case that the user stops the depression of the key member 57, the leaf spring section 56B2 moves the key member 57 frontward such that the contact member 57C is separate and away from the switch 52A. Further, the two leaf spring sections 56B2 in each pair are formed such that a direction from the base end to the forward end of one of the two leaf spring sections 56B2 is reverse in the left-right direction C to that of the other of the two leaf spring sections 56B2. By forming the two leaf spring sections 56B2 in each pair in such a manner, the end portions of the two leaf spring sections 56B2 are arranged on a straight line which passes the center of one of the through holes 56B1 (namely, the center of one of the key member 57C) and which is along the surface of the second plate-shaped member 56B. This makes it possible to achieve the balance between the urging forces of the two leaf spring sections 56B2 with respect to the key member 57 and to thereby maintain the posture of the key member 57.

The plurality of through holes 56B3 are also arranged such that two through holes 56B3, included in the plurality of through holes 56B3 (and forming a pair), correspond to each of plurality of the through holes 56B1. More specifically, two through holes 56B3 in each pair are arranged such that the two through holes 56B3 are adjacent to one of the through holes 56B1 and on both the right and left sides, respectively, of one of the through holes 56B1. Further, as depicted in FIG. 7, a projection 56B4 projecting leftwardly is formed in a left end portion of the second plate-shaped member 56B.

<Third Plate-Shaped Member 56C>

Figure 8:
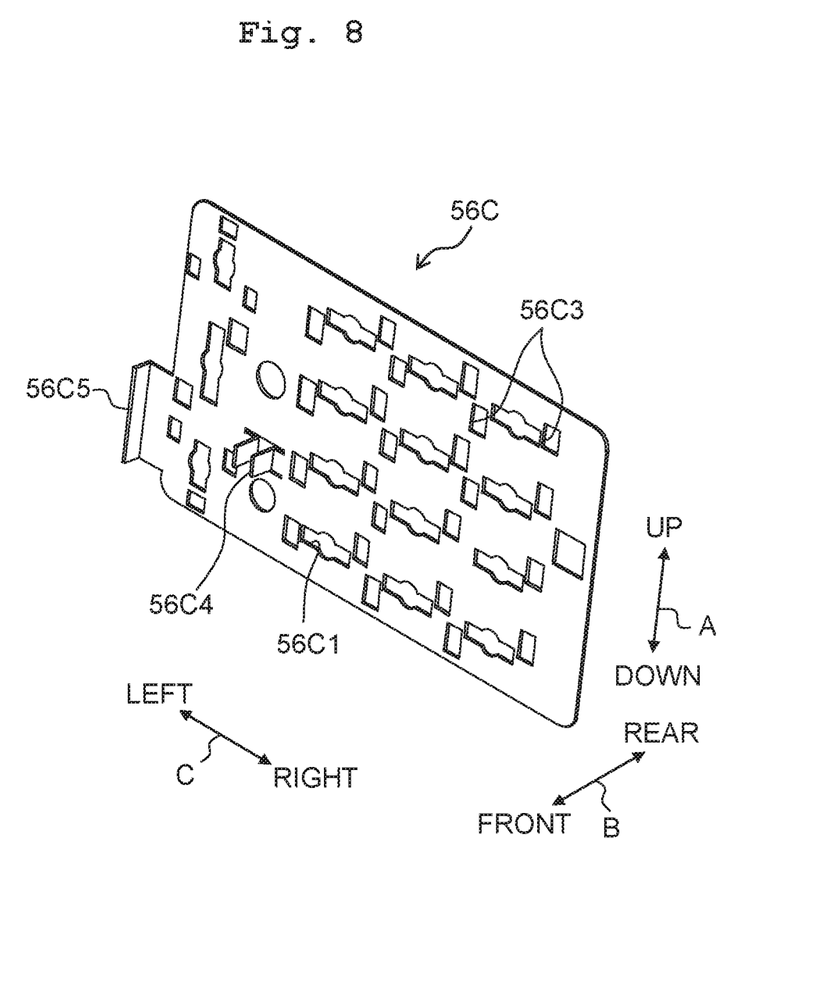
FIG. 8 is a perspective view of a third plate-shaped member as depicted in FIG. 4.

The third plate-shaped member 56C is arranged between the first plate-shaped member 56A and the substrate 52 as depicted in FIGS. 5 and 6, and is formed of a metallic material which is similar to that forming the second plate-shaped member 56B. Further, as depicted in FIG. 8, the third plate-shaped member 56C is formed with a plurality of through holes (third through portions) 56C1 and a plurality of through holes 56C3. As depicted in FIG. 6, each of the through holes 56C1 is formed such that each of the through holes 56C1 faces one of the through holes 56A1. A top portion (front end portion) of the switch 52A can be inserted into each of the through holes 56C1, and the contacting portion 57C of the key member 57 can be inserted into each of the through holes 56C1. Furthermore, each of the through holes 56C1 is formed to be long in the left-right direction C.

The plurality of through holes 56C3 are arranged such that two through holes 56C3, included in the plurality of through holes 56C3 (and forming a pair), correspond to each of plurality of the through holes 56C1. More specifically, two through holes 56C3 in each pair are arranged respectively such that the two through holes 56C3 are adjacent to one of the through holes 56C1 and on both the right and left sides, respectively, of one of the through holes 56C1. Each of the two through holes 56C3 faces, in the front-rear direction B, one of the two through holes 56A3 forming the pair in the first plate-shaped member 56A as described above. Further, any through hole is not formed in a location, in the third plate-shaped member 56C, which faces each of the through holes 56A2 in the front-rear direction B.

Figure 9:
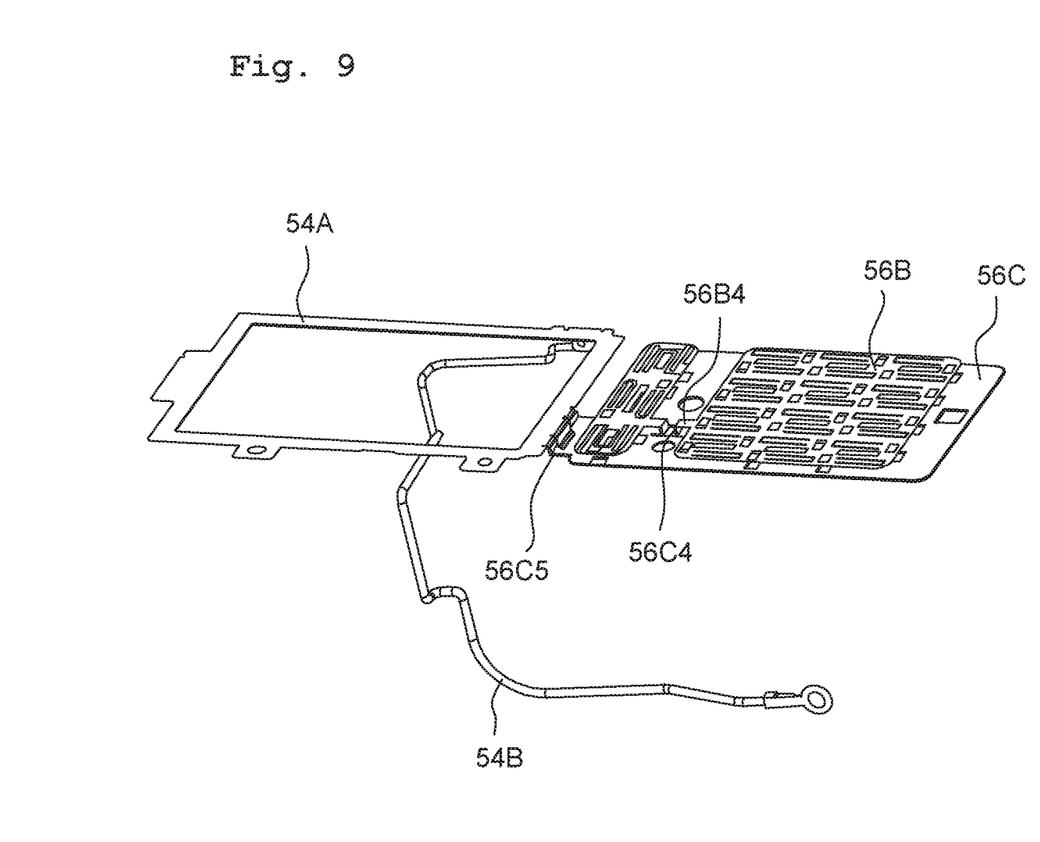
FIG. 9 is a schematic perspective view depicting a situation that a supporting section as depicted in FIG. 4 is electrically connected to the second and third plate-shaped members as depicted in FIG. 4.

A bent piece 56C4 which is bent frontward is formed in the third plate-shaped member 56C. As depicted in FIG. 8, the bent piece 56C4 is formed in a somewhat leftward portion, rather than the central portion, in the left-right direction C of the plate-shaped member 56C. As depicted in FIG. 9, the bent piece 56C4 is formed such that a front end of the bent piece 56C4 makes contact with a forward end of the projection 56B4 along the front-rear direction B, thereby connecting the second plate-shaped member 56B and the third plate-shaped member 56C electrically with each other. Further, a bent piece 56C5 which is bent frontwardly is formed in left-side end portion of the third plate-shaped member 56C. As depicted in FIG. 9, the bent piece 56C5 is formed so as to make contact with the support section MA of the panel unit 54. With this, the support section 54A and the third plate-shaped member 56C are connected electrically with each other. The support section 54A is grounded by a cable 54B. Namely, the second plate-shaped member 56B, the third plate-shaped member 56C and the supporting section 54A are connected electrically to one another and are grounded.

As described above, according to the operating apparatus 70 adopted in the multi-function peripheral 10 related to the present embodiment, the durability is improved since the leaf spring section 56B2 configured to urge the key member 57 frontwardly (in the second direction) is formed in the second plate-shaped member 56B made of metal. Further, the first plate-shaped member 56A and the third plate-shaped member 56C are present in this order between the second plate-shaped member 56B and the substrate 52. Accordingly, even in a case that the static electricity accumulated in the leaf spring section 56B2 is moved, for example, such that the static electricity is discharged from the end portion of the leaf spring section 56B2 toward the substrate 52, it is possible to receive the static electricity firstly by the first plate-shaped member 56A. The static electricity, which cannot be received fully by the first plate-shaped member 56A, can be received by the third plate-shaped member 56C made of metal. This makes the movement of the static electricity to the substrate 52 to occur less easily, thereby making it possible to suppress any malfunction of the key inputting apparatus 70.

Since the second plate-shaped member 56B is electrically connected to the third plate-shaped member 56C, the static electricity is thus less likely to be accumulated in the second plate-shaped member 56B. Thus, the static electricity is less likely to move such that the static electricity is discharged from the end portion of the leaf spring portion 56B2.

The third plate-shaped member 56C is grounded via the support section 54A and the cable 54B. This makes it further difficult for the static electricity to be accumulated in the second plate-shaped member 56B. As a modification, the second plate-shaped member 56B may be grounded, or the second plate-shaped member 56B and the third plate-shaped member 56C are both grounded. In such cases also, a similar effect to the above-described effect can be achieved.

The first plate-shaped member 56A is integrally formed with the panel face member 70A. With this, the first plate-shaped member 56A is not shifted (deviated) with respect to the panel face member 70A, thereby improving the precision with which the key member 57, which is restricted by the first plate-shaped member 56A, is attached with respect to the panel face member 70A.

Since any through hole is not formed in the third plate-shaped member 56A at the area facing each of the through holes 56A2. Accordingly, it is possible to effectively receive, by the third plate-shaped member 56C, the static electricity which moves such that the static electricity is discharged from the end portion of the leaf spring section 56B2. Accordingly, it is possible to further suppress any malfunction due to the static electricity.

In the foregoing, the embodiment of the present teaching has been explained. However, the present teaching is not limited to or restricted by the above-described embodiment, and a variety of kinds of change can be made to the embodiment of the present teaching within the range of the description in the following claims. For example, it is allowable that the second plate-shaped member 56B and the third plate-shaped member 56C are not electrically connected to each other. Alternatively, it is allowable that the second plate-shaped member 56B is not grounded. Still alternatively, the second plate-shaped member 56B may be formed as a separate member from the panel face member 70A. Further alternatively, a trough hole may be formed in the second plate-shaped member 56C at the area, of the third plate-shaped member 56C, facing each of the through holes 56A2. Further, it is allowable that the through holes 56A1, 56A2, 56B1 and 56C1 penetrate (pass) through the plate-shaped members 56A, 56B and 56C, respectively; it is also allowable that each of the through holes 56A1, 56A2, 56B1 and 56C1 is formed as a through portion having a cutout form.

Further, the leaf spring sections 56B2 may be arranged such that the direction from the base end to the forward end of each of the leaf spring sections 56B2 is same, and may be arranged on a straight line which passes the center of one of the through holes 56B1, corresponding to two leaf spring sections 56B2 among the leaf spring sections 56B2, and which is along the surface of the second plate-shaped member 56B. Furthermore, the operating apparatus 70 is not limited to that adopted to the multi-function peripheral, and may be adopted to an apparatus which is similar to the multi-function peripheral.

What is claimed is:

1. A key inputting apparatus comprising:
   a substrate provided with a switch;
   a key having a depression surface and a back surface on an opposite side to the depression surface, and a contacting section projecting from the back surface in a first direction from the depression surface toward the back surface, the contacting section making contact with the switch in a state that the depression surface is depressed;
   a panel having an opening in which the key is arranged;
   a first plate arranged between the substrate and the key in the opening of the panel, the first plate being made of a resin and formed with a first through portion, through which the contacting section is passable and which is configured to regulate movement of the contacting section in a crossing direction crossing the first direction;
   a second plate supported by the first plate between the key and the first plate, the second plate being made of a metal, the second plate being formed with: a second through portion through which the contacting section is passable; and a leaf spring section which urges the key in a second direction opposite to the first direction, the leaf spring section being a cantilevered leaf spring in which an end portion is a free end; and
   a third plate arranged between the first plate and the substrate, the third plate being made of a metal and formed with a third through portion into which the contacting section is insertable.

2. The key inputting apparatus according to claim 1, wherein the second plate is electrically connected to the third plate.

3. The key inputting apparatus according to claim 2, wherein at least one of the second plate and the third plate is grounded.

4. The key inputting apparatus according to claim 1, wherein the first plate is formed integrally with the panel.

5. The key inputting apparatus according to claim 1, wherein the first plate is formed with a fourth through portion which is configured to face the leaf spring section such that the end portion of the leaf spring section is allowed to go into and out of the fourth through portion in a case that the end portion of the leaf spring section is displaced; and
   The third plate is formed with no through hole in an area facing the fourth through portion.

6. The key inputting apparatus according to claim 1, wherein the leaf spring section is included in two leaf spring sections, the two leaf spring sections being formed along a facing surface of the second plate to sandwich the second through portion therebetween in a third direction, the facing surface of the second plate facing the key;
   the two leaf spring sections extend parallel to each other in a fourth direction, which is parallel to the facing surface of the second plate and which crosses the third direction, the two leaf spring sections being formed such that a direction from a fixed end to the free end of one of the two leaf spring sections is reverse to that of the other of the two leaf spring sections.

* * * * *